Nov. 13, 1928.

E. H. RYERSON 1,691,858

DISH DRAINER

Original Filed April 27, 1923

Inventor:
Eugene H. Ryerson
By Attorneys

Patented Nov. 13, 1928.

1,691,858

UNITED STATES PATENT OFFICE.

EUGENE H. RYERSON, OF WORCESTER, MASSACHUSETTS.

DISH DRAINER.

Original application filed April 27, 1923, Serial No. 635,141. Divided and this application filed October 8, 1926, Serial No 140,361. Renewed September 15, 1928.

This is a division of my Patent No. 1,604,608 issued October 26, 1926, on an application Serial No. 635,141 filed April 27, 1923.

This invention relates to a dish drainer and especially to that type of this article which is provided with means for holding the plates on edge and separate means for holding knives, forks and spoons, and other small articles.

The principal objects of this invention are to provide a dish drainer of the basket type with a rack for supporting the plates on edge, said rack cooperating with the features of the basket to permit of the plates being held in place in this way; to provide a basket for holding the cutlery that can be turned over to permit nesting the drainers for shipment and storage. The principal advantage of the reversible cutlery basket is that the dish drainers can be nested together so that the whole outfit can be shipped in much smaller space than is the case if the cutlery baskets are made in permanent position in the basket. It also is advantageous in connection with the cleaning of the device.

Reference is to be had to the accompanying drawings, in which

Fig. 1 is a plan of a preferred embodiment of this invention;

Fig. 2 is a side view of the basket with the cutlery dish drainer shown in position for nesting; and Fig. 3 is an end view thereof without the cutlery basket.

I have shown an ordinary woven wire dish drainer 10 having cross wires 11 spaced a convenient distance apart for a purpose that will appear. The longitudinal wires 12 can be spaced in any desired way, the spacing not being important but through the center of the rack longitudinally they are omitted, leaving rectangular transverse spaces 13 for the reception of the lower edges of the plates when they are supported in the device as hereinafter described. There is a larger wire 14 around the top of the basket. This basket aside from the features above mentioned can be made in any desired way and is of simple and inexpensive construction.

For the purpose of supporting the plates and other articles, I provide a rack comprising two longitudinal wires 20 of greater diameter and strength than the wires of which the basket is made preferably. These wires extend upwardly at their ends to form inclines 21 oppositely arranged. These inclines at the top are bent over outwardly to form eyes 22. The bottom longitudinal wires 20 of the rack are secured to the basket, the upwardly inclined ends 21 being bent around the margin wire of the basket and permanently fixed in position.

For the purpose of constituting a rack, a series of U-shaped wires 25 are employed having horizontal feet 26 which are soldered, welded or otherwise secured to the longitudinal wires 20. These are spaced apart about the same distance at the bottom as the transverse wires 11 of the basket and register with them so that they coincide with the sides of the rectangles 13 and allow the plates to project down slightly below the bottom of the rack and of the drainer. These wires 26 forming the rack preferably are arranged spaced from each other at the two ends and in a slightly slanting position. These are permanently attached to the wires 20.

It will be seen that two drainers can be nested one within the other when the cutlery basket 37 is in the position shown in Fig. 2. In this case the cutlery basket above will rest in a position over the one below. If this basket were to be turned over to the interior position shown in Fig. 1, the bottom of the dish drainer above would have to rest on this cutlery basket. Thus any number of dish drainers piled one upon another would take up nearly twice as much space. At the same time the cutlery basket is not detachable and therefore always is in a convenient position to be used. It will be seen that it covers a space at the end of the rack not otherwise occupied, and yet does not reduce the capacity of the plate rack, as the wires are slanted backwardly away from it.

A cutlery basket 37 made of woven wire fabric with a surrounding frame is located in the space at the end of the rack. It is provided with hinges 38 integral with this frame by which it is pivoted to the end wire of the basket. The object of this construction is to permit of its being turned over into the basket as shown in Fig. 1 in full lines for use therein and also to be turned over outside, as shown in Fig. 2 to facilitate the packing of the device. This also facilitates cleaning. The movement of the cutlery basket permits a plurality of these dish drainers to be stored or shipped in small compass.

In the use of the device, the plates are set up on edge in the rack with their edges projecting down below it and into the rectangles 13, the cutlery is placed in the small basket 37 and the cups and glasses in the two spaces at the sides of the rack.

Although I have illustrated and described only one form of the invention I am aware of the fact that modifications can be made therein without departing from the scope of the invention as expressed in the claim. Therefore I do not wish to be limited to all the details of construction herein shown and described but what I do claim is:—

As an article of manufacture, a dish drainer comprising a bottom having a series of transverse wires with spaces between them and a plate rack mounted above the bottom, having a series of upwardly extending looped wires for separating the plates from each other and engaging them near their centers to hold them in upright position, said rack having transverse wires forming a series of spaces in the bottom registering with the spaces in the bottom of the dish drainer and spaced therefrom whereby a series of dish drainers can be nested together without removing the racks, the looped wires of each dish drainer projecting through the bottom of the one above.

In testimony whereof I have hereunto affixed my signature.

EUGENE H. RYERSON.